(12) United States Patent
Stueven et al.

(10) Patent No.: US 8,070,351 B2
(45) Date of Patent: Dec. 6, 2011

(54) MIXING KNEADER AND PROCESS FOR PREPARING POLY(METH)ACRYLATES USING THE MIXING KNEADER

(75) Inventors: Uwe Stueven, Bad Soden (DE); Leo Van Miert, Antwerp (BE); Dominicus van Esbroeck, Antwerpen (NL); Oskar Stephan, Hockenheim (DE); Annemarie Hillebrecht, Mannheim (DE); Huanmin Wei, Frankenthal (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1232 days.

(21) Appl. No.: 11/663,753

(22) PCT Filed: Sep. 28, 2005

(86) PCT No.: PCT/EP2005/010469
§ 371 (c)(1),
(2), (4) Date: Mar. 26, 2007

(87) PCT Pub. No.: WO2006/034853
PCT Pub. Date: Apr. 6, 2006

(65) Prior Publication Data
US 2008/0080300 A1    Apr. 3, 2008

(30) Foreign Application Priority Data
Sep. 28, 2004  (DE) .......................... 10 2004 047 430

(51) Int. Cl.
*B01F 7/04* (2006.01)
*B01F 15/02* (2006.01)

(52) U.S. Cl. ........................... 366/97; 366/193; 366/301

(58) Field of Classification Search .................... 366/64, 366/66, 77, 79–91, 96–99, 192–196, 292, 366/297–301; 422/225, 226, 228, 135; 425/203, 425/204, 208, 209
See application file for complete search history.

(56) References Cited

U.S. PATENT DOCUMENTS
1,418,642 A    6/1922   Gerard
(Continued)

FOREIGN PATENT DOCUMENTS
CA    2 070 539    12/1992
(Continued)

OTHER PUBLICATIONS
International Search Report in PCT/EP2005/010469 dated Mar. 2, 2006.

*Primary Examiner* — Charles E Cooley
(74) *Attorney, Agent, or Firm* — Marshall, Gerstein & Borun LLP (57) ABSTRACT

The invention relates to a mixing kneader comprising at least two shafts (2,3) configured as hollow shafts, on whose surfaces kneading bars (4) are disposed on elements (5). The construction of the shafts is selected in such a way that the resonant frequencies of the shafts have a separation of at least 5% from the excitation frequencies. At least one of the shafts is preferably flowed through by a temperature-control medium, the inlet being disposed on one side and the outlet on the other side of the shaft. The mixing kneader preferably comprises at least one orifice above the shafts which is configured as a dome, the dome being closed by a displacer (22). In addition, at least one orifice for product withdrawal is provided, whose orifice cross section is adjustable during operation.

20 Claims, 4 Drawing Sheets

U.S. PATENT DOCUMENTS

| | | | |
|---|---|---|---|
| 1,851,388 A * | 3/1932 | Hackstedde | 366/99 |
| 2,121,486 A * | 6/1938 | Merchen | 222/247 |
| 2,368,102 A | 1/1945 | Bowman | |
| 2,504,337 A | 4/1950 | Loomis | |
| 3,234,303 A | 2/1966 | Bild | |
| 3,237,241 A * | 3/1966 | Gagliardi | 366/91 |
| 3,239,878 A * | 3/1966 | Ahlefeld, Jr. et al. | 366/77 |
| 3,332,368 A | 7/1967 | Stickelber | |
| 3,463,459 A | 8/1969 | Loomans | |
| 3,561,046 A * | 2/1971 | Comes et al. | 425/96 |
| 3,687,422 A * | 8/1972 | List | 366/289 |
| 3,951,389 A | 4/1976 | Porter | |
| 4,037,753 A | 7/1977 | Brandau et al. | |
| 4,542,992 A * | 9/1985 | Markhart | 366/300 |
| 4,681,457 A * | 7/1987 | Orimo et al. | 366/84 |
| 4,761,897 A | 8/1988 | Tazaki et al. | |
| 4,889,431 A * | 12/1989 | Liechti | 366/99 |
| 4,941,130 A * | 7/1990 | List et al. | 366/99 |
| 4,950,081 A * | 8/1990 | List | 366/85 |
| 5,382,089 A | 1/1995 | Mosher | |
| 5,407,266 A * | 4/1995 | Dotsch et al. | 366/97 |
| 5,492,403 A * | 2/1996 | Metcalf et al. | 366/77 |
| 5,603,564 A * | 2/1997 | Zimmermann | 366/77 |
| 6,039,469 A * | 3/2000 | Palmer | 366/97 |
| 6,268,442 B1 | 7/2001 | Gustafsson et al. | |
| 6,710,141 B1 | 3/2004 | Heide et al. | |
| 6,846,103 B2 * | 1/2005 | Okamoto et al. | 366/297 |
| 7,637,650 B2 * | 12/2009 | Ueda et al. | 366/77 |
| 2008/0080300 A1 * | 4/2008 | Stueven et al. | 366/132 |

FOREIGN PATENT DOCUMENTS

| | | |
|---|---|---|
| EP | 0 084 426 | 7/1983 |
| EP | 0 517 068 | 12/1992 |
| EP | 0 603 525 | 6/1994 |
| GB | 1 453 142 | 10/1976 |
| SU | 958108 | 9/1982 |
| WO | WO-97/12666 | 4/1997 |
| WO | WO-01/38402 | 5/2001 |
| WO | WO 02/089963 A2 * | 11/2002 |
| WO | WO-03/022896 | 3/2003 |
| WO | WO-2004/022608 | 3/2004 |

* cited by examiner

MIXING KNEADER AND PROCESS FOR PREPARING POLY(METH)ACRYLATES USING THE MIXING KNEADER

CROSS-REFERENCE TO RELATED APPLICATIONS

This is the U.S. national phase application of International Application No. PCT/EP2005/010469, filed Sep. 28, 2005, which claims the benefit of German patent application No. 10 2004 047 430.3, filed Sep. 28, 2004.

The invention relates to a mixing kneader having at least two shafts, on whose surfaces are disposed kneading bars on elements, and to a process for preparing poly(meth)acrylates using the mixing kneader.

A mixing kneader having at least two axially parallel-rotating shafts, on whose surfaces are provided disk faces with kneading bars arranged on their periphery, is known, for example, from EP-A 0 517 068. The kneading bars are arranged in such a way that those on one shaft mesh into those on the other shaft. Depending on the rotation rate of the shafts, which may be different, the number of kneading bars on the shafts may vary. For example, in the case of a rotation rate ratio of 1:4, for example, 8 kneading bars are arranged over the periphery on the main shaft and 2 kneading bars on the second shaft referred to as the cleaning shaft, which rotates four times more rapidly than the main shaft.

In addition to mixing and kneading, the kneading bars of the cleaning shaft also serve to clean the main shaft. In order to prevent product from remaining stuck to the shafts, they may be designed, as described in EP-A 0 603 525, to be movable back and forth in an oscillating manner in the axial direction.

Improved conveying of the product in the mixing kneader can be achieved by the elements to which the kneading bars are attached being axially offset or arranged at an angle to the shaft axis, in such a way that a spiral-like path is formed by the elements. Such an arrangement of the elements on the shafts is known, for example, from WO 97/12666.

WO-A 2004/022608 discloses the use of a mixing kneader having two rotatably mounted shafts, on whose surfaces are disposed kneading bars for producing superabsorbents. Superabsorbents are gel-like polymers. The polymerization is carried out either in a homogeneous aqueous monomer solution or in a heterogeneous basin oil mixture. As a result of the use of the mixing kneader as a polymerization reactor, small gel particles are produced.

The polymerization of monomers to water-absorbent, water-soluble polymers in a reactor system which comprises at least three zones is described in WO-A 03/022896. In the first zone, a monomer, an initiator and water are fed continuously under such conditions that the polymerization of the monomer is initiated. In the second zone is disposed a gel phase which is generated by the polymerization of the monomer, and the gel phase is granulated in the third zone.

WO-A 01/38402 likewise discloses a process for continuously preparing crosslinked fine particles of polymerization gel. The reaction is carried out in a mixing kneader having at least two axially parallel rotating shafts equipped with a plurality of kneading and transporting elements which convey the substances introduced at the upstream end of the mixing kneader in the axial direction toward the downstream end of the mixer.

A disadvantage of the mixing kneaders known from the prior art is that the drives provided and required can give rise, owing to the polymerization and associated product consistency, to large shear forces in the mixing kneader which can lead to crack formation in the shafts and to damage to the kneading bars.

It is an object of the present invention to provide a mixing kneader on the production scale whose shafts are mechanically stable toward the high shear forces occurring. It is a further object of the invention to provide a process for poly (meth)acrylate preparation which can be operated continuously over a prolonged period.

The object is achieved by a mixing kneader comprising at least two shafts on whose surfaces are disposed kneading bars on elements and which are enclosed by a casing, in which at least one orifice above the shafts and at least one orifice for product removal are formed, the shafts being mounted so as to be rotatable at the same or different rates and in the same or opposite sense at both ends and being driven at least one end. In this mixing kneader, at least one of the following features is provided for:

(a) the shafts are designed in such a way that the flexural resonant frequencies of the shafts have a separation of at least 5%, preferably of at least 15% and in particular of at least 20%, from the excitation frequencies,
(b) at least one shaft is configured as a hollow shaft and is flowed through by a temperature-control medium, the inlet being disposed on one side of the shaft and the outlet on the other side of the shaft,
(c) the at least one orifice is closed above the shafts by a displacer whose side facing the shafts is configured such that a gap is present between the displacer and the kneading bars of the shafts and has a maximum gap width which corresponds to the available gap width between kneading bars and casing,
(d) the cross section of the orifice for product removal is adjustable during operation.

The further object is achieved by a process for poly(meth) acrylate preparation in which the inventive mixing kneader is used.

In a particularly preferred embodiment of the invention, all features are simultaneously provided for.

The mixing kneader preferably has a reactor volume of at least 500 l, more preferably of at least 2000 l and particularly preferably of at least 5000 l.

In a mixing kneader having two shafts, one shaft is known as the main shaft and the second shaft as the cleaning shaft. Both on the main shaft and on the cleaning shaft, kneading bars are disposed and may have any suitable shape. The number of kneading bars distributed over the circumference on the main shaft may differ from that on the cleaning shaft. When the number of kneading bars on the main and cleaning shafts is different, the shaft are driven at different rotation rates. The cleaning shaft refers to that shaft which has fewer kneading bars distributed over the circumference and rotates more rapidly. The rotation rate ratio depends upon the ratio of the number of kneading bars, as described, for example, in EP-A 0 517 068. The shafts may be driven either in the same or opposite sense.

Owing to the rotational motion of the shafts and as a result of forces acting nonuniformly on the shafts, they are excited to give resonant vibrations. The forces acting nonuniformly result, for example, from the comminution of the product into a free-flowing state.

A vibrational excitation of the shaft is prevented when the flexural resonant frequencies of the shaft have at least 5%, preferably at least 15% and more preferably at least 20%, separation from the excitation frequencies. The resonant frequencies are determined by the shaft construction, the shaft materials and the wall thickness of the shaft. The excitation frequencies are determined by the rotation rate and the multiple of the rotation rate.

A further cause of the occurrence of tensions in the shaft which then lead to crack formation is the caking of product on the shaft which is not fully cleaned off. Cooling of the shafts results in a condensate layer forming on the shaft surface, as a result of which the caking of product is prevented. The shafts are cooled by the flow of temperature-control medium through the shafts. The temperature-control medium preferably has an inlet temperature of not more than 80° C., more preferably of not more than 40° C. and particularly preferably of not more than 20° C.

The prior art discloses the arrangement of the inlet and the outlet for the temperature-control medium on the same side of the shaft. This necessitates a complex construction of the shaft, since the temperature-control medium initially has to be conducted through the entire shaft and subsequently has to be conducted through a further channel laying within the shaft. This complex construction necessitates a large number of further weld seams which are greatly stressed during operation and can be subject to damage.

In a preferred embodiment of the inventive mixing kneader, the temperature-control medium is fed through an inlet on one side of the shaft and removed again through an outlet on the other side of the shaft. The cooling is effected preferably in countercurrent. This means that the temperature-control medium is added on the side of the shafts on which the product is removed. Suitable temperature-control media are, for example, water or heat transfer oils.

In a preferred embodiment, the at least one orifice above the shafts is formed as a dome in the casing. In the mixing kneaders known from the prior art, product can start to collect in the dome and cake. As soon as they pass out of the dome back into the mixing kneader, these caked lumps lead to increased shear stress on the kneading bars and on the shafts, which then results in an increased tendency to crack formation. In order to prevent the caked lumps and deposits, the at least one orifice above the shafts may be closed by a displacer whose side facing the shafts is configured such that a gap is present between the displacer and the kneading bars of the shafts and has a maximum gap width which corresponds to the available gap width between kneading bars and casing.

In a preferred embodiment, at least one channel for reactant feeding is formed in the displacer with which the dome is closed above the shafts in the casing. Depending on whether liquid or solid reactants are fed, and depending upon the volume flow rate of the reactants fed, the channel for reactant feeding is designed with cross sections of varying size. For the supply of solids, in a particularly preferred embodiment, a metering device is accommodated in the channel for reactant feeding. Suitable metering devices are, for example, a screw, a double screw, a star feeder or any other industrial metering apparatus known to those skilled in the art.

The displacer is preferably configured in such a way that it is accommodated by a push fit in a precisely fitting manner by the orifice above the shafts, so that the formation of dead zones between the orifice above the shafts and the displacer is prevented.

In a preferred embodiment, the at least one channel for reactant feeding in the displacer is provided with a plastics surface. To this end, the channel may either be provided by a plastics channel which is conducted through the displacer or the channel is coated with a plastic. Suitable plastics are, for example, polyolefins; polypropylene is particularly suitable.

In the case of at least two channels in the displacer, the orifices facing the shafts are preferably arranged close to one another.

Product can start to collect and polymerize in dead zones, which in turn results in increased stress on the kneading bars and on the shafts as soon as the polymerized product passes out of the dead zones back into the mixed region.

The mixing kneader is preferably operated in such a way that sufficient comminution of the product prevents the formation of lumps from deposits in dead zones. These may also occur, for example, in the region of the orifice for product removal or in other regions of the mixing kneader. It has been shown that comminution increases with increasing fill level of the mixing kneader. The fill level within the mixing kneader can be adjusted via the cross section of the orifice for product removal. Thus, a reduction in the orifice cross section leads to an increase in the fill level at constant rotation rate of the shafts for the same product. Therefore, the cross section of the orifice for product removal is preferably adjustable during operation. This allows the fill level to be adjusted without repeating startup and shutdown of the mixing kneader, which takes a large amount of time.

In a first embodiment, the orifice cross section is adjusted by a flap shiftable in axial direction. In a further embodiment, the cross section of the orifice for product removal is adjusted by a flap shiftable in tangential direction. In addition, it is also possible to use a flap which is shiftable simultaneously in axial and tangential directions. The preferred direction for the closure of the orifice for product removal in the case of a flap shiftable in tangential direction is from bottom to top.

The orifice for product removal may be disposed either on the side of the main shaft, on the side of the cleaning shaft or on the end face of the mixing kneader. The orifice for product removal preferably has a rectangular cross section and has an opening angle which is in the range of from 10 to 20°, preferably in the range of from 15 to 20° and more preferably 15°. The apex of the opening angle is on the axis of the shaft on whose side the orifice for product removal is disposed. The lower edge of the orifice for product removal, in the case of a tangentially shiftable flap for adjusting the orifice cross section, is preferably at an angle in the range of from 30 to 55° based on the perpendicular, the apex of the angle likewise being on the axis of the shaft on whose side the orifice is disposed.

In addition to a flap shiftable in axial direction or a flap shiftable in tangential direction, it is also possible to adjust the cross section of the orifice for product removal by a flap shiftable in axial direction and a flap shiftable in tangential direction.

In a preferred embodiment, the orifice for product removal is formed by a weir, variable during operation, in the casing wall. It is likewise possible to adjust the fill level in the mixing kneader via the height of the weir. The fill level is also dependent upon the product formulation, the throughput and the rotation rate. The upper edge of the weir forms the lower edge of the orifice for product removal. The height of the weir is preferably adjusted by tangential shifting of the weir during operation.

In order to prevent large shear forces from being transferred to the shafts on startup of the mixing kneader, the mixing kneader is emptied fully at or before a shutdown. When the mixing kneader is not emptied, especially in the case of poly(meth)acrylate preparation, the product continues to harden, as a result of which large lumpy products can form and initially have to be comminuted on restart. These lumpy products lead to increased shear stress on the kneading bars and on the elements to which the kneading bars are fastened.

In order to be able to empty the mixing kneader, in a preferred embodiment, an emptying orifice is formed on the product withdrawal side. The emptying orifice is preferably disposed below the middle axis in the casing and has a cross-sectional area of preferably at least 10 000 mm², more preferably at least 40 000 mm² and particularly preferably at least 80 000 mm².

Since the casing is preferably designed with a jacket in order to enable temperature control of the mixing kneader, in a preferred embodiment, the emptying flap is formed in the weir forming the orifice for product removal, since the weir is preferably designed as a simple wall without a jacket. Attached to the orifice for product withdrawal is preferably a downcomer whose walls are provided with insulation.

Suitable materials for the shafts, the elements, the kneading bars and the casing and also the displacer are all highly alloyed austenitic steels, ferritic-austenitic duplex materials, nickel-based alloys and titanium. In the selection of the suitable material, it has to be ensured that the material is stable toward the pHs, occurring in the course of poly(meth)acrylate preparation, in the range of from pH 3 to 10, preferably from pH 5 to 8.

The mixing kneader designed in accordance with the invention is preferably used to prepare crosslinked fine particles of poly(meth)acrylate gel.

Poly(meth)acrylates or related polymers are prepared generally by copolymerizing
a) water-soluble, monoethylenically unsaturated monomers,
b) from 0.001 to 5 mol %, based on the monomers (a), of monomers containing at least two ethylenically unsaturated double bonds and
c) from 0 to 20 mol %, based on the monomers (a), of water-insoluble monoethylenically unsaturated monomers
in from 20 to 80% by weight aqueous solution in the presence of initiator at temperatures of from 0 to 140° C.

Water-soluble monoethylenically unsaturated monomers of group (a) are, for example, ethylenically unsaturated $C_3$- to $C_6$-carboxylic acids, amides thereof and esters thereof with amino alcohols of the formula (I)

in which $R^4$ is $C_2$- to $C_5$-alkylene and $R^1$, $R^2$, $R^3$ are each independently hydrogen, methyl, ethyl or propyl. These compounds are, for example, acrylic acid, methacrylic acid, crotonic acid, itaconic acid, maleic acid, fumaric acid, and the alkali metal or ammonium salts of these acids, acrylamide, methacrylamide, crotonamide, dimethylaminoethyl acrylate, dimethylaminoethyl acrylate, dimethylaminopropyl acrylate, dimethylaminobutyl acrylate, dimethylaminoethyl methacrylate, dimethylaminoethyl methacrylate, dimethylaminopropyl methacrylate, dimethylaminoneopentyl acrylate and dimethylaminoneopentyl methacrylate.

The basic acrylates and methacrylates are used in the form of the salts with strong mineral acids, sulfonic acids or carboxylic acids, or in quaternized form. The anion $X^-$ for the compounds or the formula I is the acid radical of the mineral acids or of the carboxylic acids, or methosulfate, ethosulfate or halide from a quaternizing agent.

Further water-soluble monomers of group (a) are N-vinylpyrrolidone, acrylamidopropanesulfonic acid, vinylphosphonic acid and/or alkali metal or ammonium salts of vinyl-sulfonic acid. The other acids may likewise be used in the polymerization either in non-neutralized form or in partially, or up to 100%, neutralized form. Suitable water-soluble monomers of group (a) are also diallylammonium compounds such as dimethyldiallylammonium chloride, diethyldiallylammonium chloride or diallylpiperidinium bromide, N-vinylimidazolium compounds such as salts or quaternization products of N-vinylimidazole and 1-vinyl-2-methylimidazole, and N-vinylimidazolines, such as N-vinylimidazoline, 1-vinyl-2-methylimidazoline, 1-vinyl-2-ethylimidazoline or 1-vinyl-2-n-propylimidazoline, each of which are likewise used in the polymerization in quaternized form or as a salt.

Preferred monomers of group (a) are acrylic acid, methacrylic acid and the alkali metal or ammonium salts of these acids, acrylamide and/or methacrylamide. The monomers may be copolymerized with one another in any ratio.

The monomers of group (a) are polymerized in the presence of crosslinkers (monomers of group (b)). The crosslinkers contain at least two ethylenically unsaturated double bonds.

Suitable crosslinkers are, for example, N,N'-methylenebisacrylamide, polyethylene glycol diacrylates and polyethylene glycol dimethacrylates, each of which derive from polyethylene glycols of molecular weight of from 126 to 8500, preferably from 400 to 2000, trimethylolpropane triacrylate, trimethylolpropane trimethacrylate, ethylene glycol diacrylate, propylene glycol diacrylate, butanediol diacrylate, hexanediol diacrylate, hexanediol dimethacrylate, diacrylates and dimethacrylates of block copolymers of ethylene oxide and propylene oxide, polyhydric alcohols, such as glycerol or pentaerythritol, di- or triesterified with acrylic acid or methacrylic acid, triallylamine, tetraallylethylenediamine, divinylbenzene, diallyl phthalate, polyethylene glycol divinyl ethers of polyethylene glycols of molecular weight of from 126 to 4000, trimethylolpropane diallyl ether, butanediol divinyl ether, pentaerythritol triallyl ether and/or divinylethyleneurea. Preference is given to using water-soluble crosslinkers, for example N,N-methylenebisacrylamide, polyethylene glycol diacrylate, polyethylene glycol dimethacrylate, pentaerythritol triallyl ether and/or divinylurea. The monomers of group (b) are used in the copolymerization in amounts of from 0.001 to 5 mol %, preferably from 0.005 to 0.5 mol %, based on the monomers (a).

When a change in the properties of the copolymers is desired, the copolymerization of the monomers of groups (a) and (b) may be carried out additionally in the presence of monomers of group (c). Useful monomers of group (c) are, for example, hydroxyethyl acrylate, hydroxypropyl acrylate, hydroxyethyl methacrylate, hydroxypropyl methacrylate, acrylonitrile and/or methacrylonitrile. Also suitable are esters of acrylic acid or methacrylic acid with monohydric alcohols containing from 1 to 18 carbon atoms, for example methyl acrylate, ethyl acrylate, propyl acrylate, isopropyl acrylate, n-butyl acrylate, isobutyl acrylate, hexyl acrylate, 2-ethylhexyl acrylate, stearyl acrylate, the corresponding esters of methacrylic acid, diethyl fumarate, diethyl maleate, dimethyl maleate, dibutyl maleate, vinyl acetate and vinyl propionate. When the monomers of group (c) are used to modify the water-soluble poly(meth)acrylates, from 0.5 to 20 mol %, preferably from 2 to 10 mol %, based on the monomers (a), is used.

The water-insoluble monomers may, if they are also used in the copolymerization, be distributed finely in the aqueous solution with the aid of emulsifiers. Suitable emulsifiers are, for example, ethoxylated nonylphenols, ethoxylated castor oil, alkyl sulfates, sorbitan fatty acid esters, ethoxylated sorbitols, ethoxylated sorbitan fatty acid esters and alkylsulfonates.

Such emulsifiers are used in an amount of from 0 to 3% by weight, based on the monomers (a).

The polymerization may if appropriate be effected in the presence of the customary polymerization regulators. Suitable polymerization regulators are, for example, thio compounds, such as thioglycolic acid, mercapto alcohols, e.g. 2-mercaptoethanol, mercaptopropanol and mercaptobutanol, dodecyl mercaptan, formic acid, ammonia and amines, e.g. ethanolamine, diethanolamine, triethanolamine, triethylamine, morpholine and piperidine.

The monomers (a), (b) and, where used, (c) are copolymerized with one another in from 20 to 80% by weight, preferably from 20 to 50% by weight, in particular from 30 to 45% by weight, aqueous solution, in the presence of polymerization initiators. The polymerization initiators used may be any compounds which decompose to radicals under the polymerization conditions, for example peroxides, hydroperoxides, hydrogen peroxide, persulfates, azo compounds and what are known as redox catalysts. Preference is given to using water-soluble catalysts. In some cases, it is advantageous to use mixtures of different polymerization initiators, for example mixtures of hydrogen peroxide and sodium peroxodisulfate or potassium peroxodisulfate. Mixtures of hydrogen peroxide and sodium peroxodisulfate may be used in any ratio. Suitable organic peroxides are, for example, acetylacetone peroxide, methyl ethyl ketone peroxide, tert-butyl hydroperoxide, cumene hydroperoxide, tert-amyl perpivalate, tert-butyl perpivalate, tert-butyl perneohexanoate, tert-butyl perisobutyrate, tert-butyl per-2-ethylhexanoate, tert-butyl perisononanoate, tert-butyl permaleate, tert-butyl perbenzoate, tert-butyl per-3,5,5-trimethylhexanoate and tert-amyl perneodecanoate. Further suitable polymerization initiators are azo initiators, e.g. 2,2'-azobis(2-amidinopropane) dihydrochloride, 2,2'-azobis(N,N-dimethylene)isobutyramidine dihydrochloride, 2-(carbamoylazo)isobutyronitrile and 4,4'-azobis(4-cyanovaleric acid). The polymerization initiators mentioned are used in customary amounts, for example in amounts of from 0.01 to 5 mol %, preferably from 0.1 to 2 mol %, based on the monomers to be polymerized.

The redox catalysts comprise, as the oxidizing component at least one of the above-specified "per" compounds and, as the reducing component, for example, ascorbic acid, glucose, sorbose, ammonium or alkali metal hydrogensulfite, sulfite, thiosulfate, hyposulfite, pyrosulfite or sulfide, metal salts such as iron(II) ions or silver ions, or sodium hydroxymethylsulfoxylates. The reducing component of the redox catalyst is preferably ascorbic acid or sodium pyrosulfite. Based on the amount of monomers used in the polymerization, from $1 \cdot 10^{-5}$ to 1 mol % of the reducing component of the redox catalyst system and from $1 \cdot 10^{-5}$ to 5 mol % of the oxidizing component of the redox catalyst are used. Instead of the oxidizing component of the redox catalyst, or in addition, it is also possible to use one or more water-soluble azo initiators.

In the process according to the invention, preference is given to using a redox system consisting of hydrogen peroxide, sodium peroxodisulfate and ascorbic acid. In a customary embodiment, these components are used in the concentrations $1 \cdot 10^{-2}$ mol % of hydrogen peroxide, 0.084 mol % of sodium peroxodisulfate and $2.5 \cdot 10^{-3}$ mol % of ascorbic acid, based on the monomers.

The aqueous monomer solution may comprise the initiator in dissolved or dispersed form. However, the initiators may also be fed to the mixing kneader separately from the monomer solution.

Before the polymerization, the monomer solution is freed of residual oxygen. This is effected by means of inert gas which can be introduced in cocurrent, countercurrent or intermediate angles of introduction. Good mixing can be achieved, for example, with jets, static or dynamic mixers or bubble columns.

The monomer solution is likewise conducted through the reactor with an inert gas stream. The inert gases used may each independently be nitrogen, a noble gas such as argon, carbon monoxide, carbon dioxide, sulfur hexafluoride or mixtures of these gases. It is possible to generate the inert gas fully or partly by chemical reaction in the mixing kneader. Preference is given to using nitrogen as the inert gas.

In order to prevent high shear forces from being transferred to the kneading bars and elements and thus to the shaft on startup of the mixing kneader as a result of hardened poly(meth)acrylate residues, in a preferred process variant, the mixing kneader is emptied fully via the emptying flap at or before a shutdown.

In a preferred process variant, the mixing kneader is preheated on startup before the reactants are added. The heating is effected via the casing. For this purpose, the casing is provided with a jacket which forms a gap through which a heating medium for heating the mixing kneader flows. Suitable heating media are in particular steam, heat transfer oils or salt melts. In addition, the heating may be effected by addition of a warm medium into the mixing kneader. Suitable media are, for example, warm air, warm nitrogen or steam.

An improved comminution of the poly(meth)acrylate is achieved by initially feeding the monomers as reactants to the mixing kneader and, preferably at the position at which the monomer has been converted to a degree of 99.5% to the polymer, adding further components in the form of solid particles. Suitable solid particles are, for example, finely divided, crosslinked poly(meth)acrylate which is present in powder form. Particular preference is given to the chemical composition of the poly(meth)acrylate powder and the product prepared in the mixing kneader being identical. As well as the addition of the solid particles to the gel after 99.5% conversion, any other industrially viable addition is also possible. The addition of the solid particles prevents agglomeration, since the frictional forces between product and solid particles contribute to comminution in a high degree. This produces the shear stress on the kneading bars and elements and thus also reduces the stress on the shaft and therefore prevents crack formation in the shaft.

In a preferred process variant, the solid particles have a maximum particle size of 500 μm, more preferably of 300 μm.

In order to prevent the reacted poly(meth)acrylate from settling on the shaft and adhering to the shaft, in a preferred process variant, the shaft is cooled during operation of the mixing kneader. The cooling forms a condensate film on the shaft which prevents the poly(meth)acrylate from adhering to the shaft.

The invention is described in detail hereinbelow with reference to a drawing.

Figure 1:
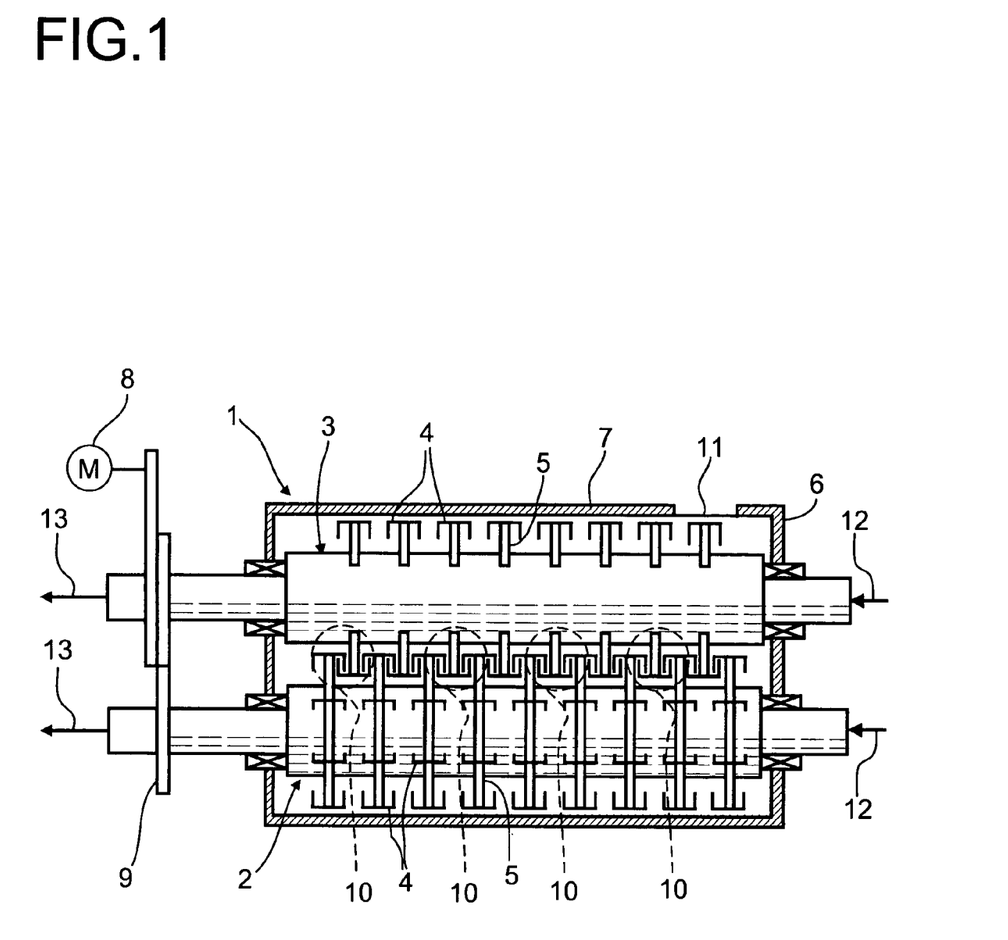
FIG. 1 shows a section through a mixing kneader in plan view.

A mixing kneader 1, as shown in FIG. 1, comprises a main shaft 2 and a cleaning shaft 3. Both on the main shaft 2 and on the cleaning shaft 3 are disposed kneading bars 4 distributed over the circumference, which are connected by elements 5 to the main shaft 2 or cleaning shaft 3. In the embodiment shown here, eight kneading bars 4 are arranged on the main shaft 2, distributed over the circumference of the main shaft 2. In contrast, only two kneading bars 4 are arranged on the cleaning shaft 3 distributed over the circumference.

The kneading bars are preferably U-shaped and, as shown in FIG. 1, intermesh as the side on which the cleaning shaft 3 and the main shafts 2 are adjacent. As a result of this, the cleaning shaft 3 removes the material which collects on the main shaft between the elements. In the embodiment shown here, in which eight kneading bars 4 are arranged on the main shaft distributed over the circumference, and two kneading bars 4 on the cleaning shaft, the cleaning shaft 3 rotates four times more rapidly than the main shaft 2. This ensures that the kneading bars 4 of the cleaning shaft 3 mesh into all kneading bars 4 of the main shaft 2. In addition to the embodiment here with eight kneading bars 4 on the main shaft 2 and two kneading bars 4 on the cleaning shaft 3, any other combination of kneading bars 4 on cleaning shaft 3 and main shaft 2 is conceivable. The rotation rate ratio of main shaft 2 to cleaning shaft 3 is set with reference to the number of kneading bars 4 on the main shaft 2 and the cleaning shaft 3.

The main shaft 2 and the cleaning shaft 3 are enclosed by a casing 6. In order to enable temperature control of the mixing kneader 1, the casing 6 is preferably designed with a jacket. This forms a gap 7 in the casing which can be flowed through by a temperature-control medium.

The shafts are preferably driven via a motor 8 and a gearbox 9. The gearbox defines the speed of the shafts 2, 3. Thus, it is possible that the main shaft 2 and the cleaning shaft 3 rotate at different speeds, but it is also possible that the main shaft 2 and the cleaning shaft 3 rotate at the same speed; in addition, the main shaft 2 and the cleaning shaft 3 may be operated in the same or opposite sense.

In the casing 6, orifices 10 are disposed above the main shaft 2 and the cleaning shaft 3 and are shown here by dashed lines. Reactants can be fed to the mixing kneader 1 via the orifices 10. It is also possible that the product prepared in the mixing kneader 1 is degassed via the orifices 10.

For product withdrawal, an orifice 11 is formed in the casing 6. The orifice 11 for product withdrawal is arranged preferably on the side of the cleaning shaft 3, but may also be arranged on the side of the main shaft 2.

To cool the main shaft 2 and the cleaning shaft 3, they are flowed through by a temperature-control medium. The arrows indicated with reference numeral 12 show the point at which the temperature-control medium is fed to the main shaft 2 and cleaning shaft 3. At the point indicated with reference numeral 13, the temperature-control medium is drawn back out of the main shaft 2 or cleaning shaft 3. In addition to the temperature control of the cleaning shaft 3 or main shaft 2 in countercurrent, shown here, temperature control of the shafts 2, 3 in cocurrent is also possible. In the event of temperature control in cocurrent, the temperature-control medium is introduced counter to the arrow direction at the point indicated with reference numeral 13 and withdrawn at the point indicated with reference numeral 12.

Figure 2:
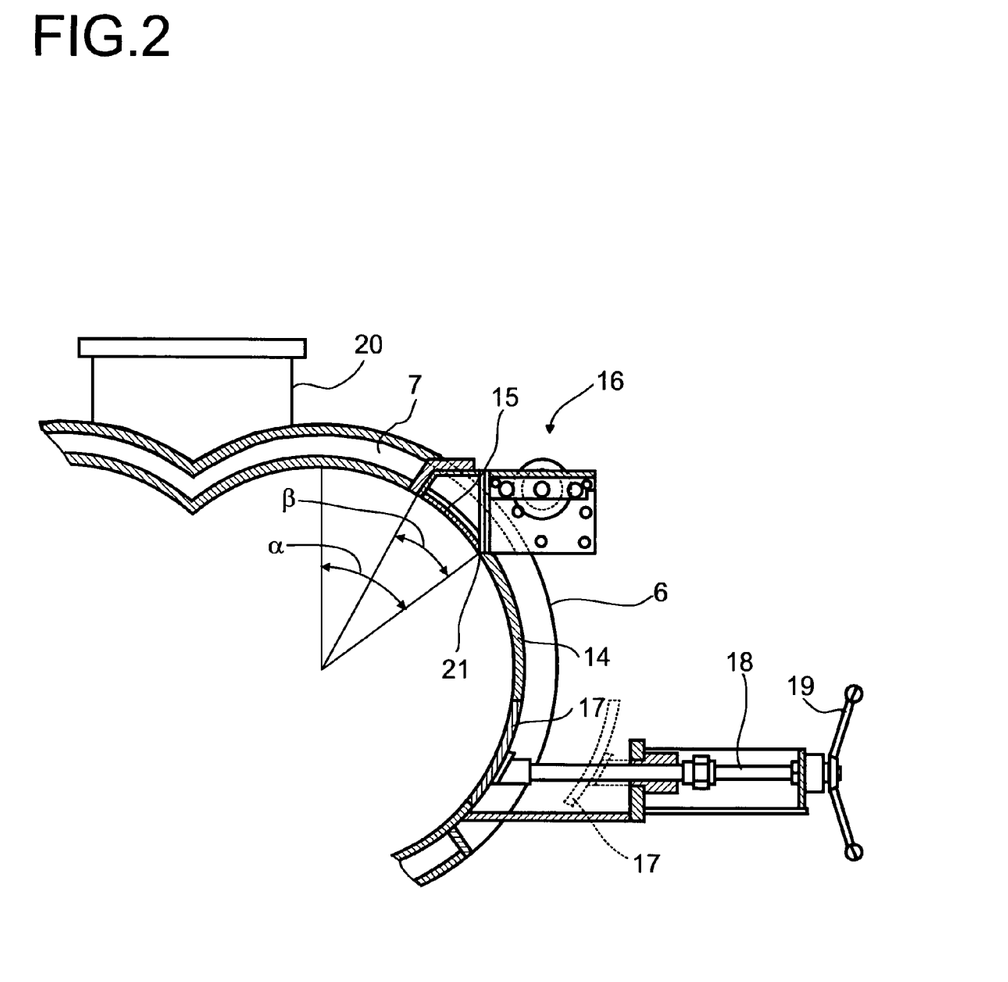
FIG. 2 shows a section through a casing section of the mixing kneader in the region of the orifice for product removal.

FIG. 2 shows a section through a casing section of a mixing kneader designed in accordance with the invention in the region of the orifice for product removal.

The casing 6 accommodates the cleaning shaft 3 and main shaft 2 preferably designed as hollow shafts. The reactants are fed via the orifices 10 above the shafts 2, 3, which are preferably designed as domes 20. For the product removal, the orifice 11 is formed in a side wall of the casing 6 as seen in FIG. 2. The orifice 11 is partly closed by a weir 14. This reduces the orifice cross section and determines the position of the orifice for product removal in the upper third of the casing 6. The closure edge 21 of the weir 14, which simultaneously forms the lower edge of the emptying orifice, is preferably arranged at an angle $\alpha$ to the perpendicular in the range of from 30 to 55°. The opening angle $\beta$ of the orifice for product removal is preferably in the range of from 10 to 20°.

The cross-sectional surface area of the orifice for product removal may be adjusted via a flap 15. To this end, the flap 15 in the embodiment shown in FIG. 2 is shiftable in the axial direction. The flap 15 is moved via a drive 16. The cross-sectional area of the orifice for product removal is used to adjust the fill level in the mixing kneader 1. The smaller the orifice cross section, the greater the fill level for the same product and constant rotation rate.

In the embodiment shown in FIG. 2, an emptying flap 17 is disposed in the lower portion of the weir 14. The emptying flap 17 is operated by means of a handwheel 19 via a spindle 18. The open position of the emptying flap 17 is shown by dashed lines.

On shutdown, the mixing kneader 1 can be emptied via the emptying flap 17. This prevents product residues from remaining in the mixing kneader 1. Especially in the case of the preparation of poly(meth)acrylates, residues lead to further hardening thereof and thus to increased shear stress on the kneading bars 4 and elements 5 on restart.

In addition to the position of the emptying flap 17 in the weir 14, as shown in FIG. 2, the emptying flap 17 may also be disposed at any other position in the casing 6. The emptying flap 17 is preferably disposed on the product withdrawal side in the casing 6. The weir 14 and thus the orifice for product removal and the emptying flap 17 may be disposed either on the side of the cleaning shaft 3 or on the side of the main shaft 2 in the casing 6.

Figure 3:
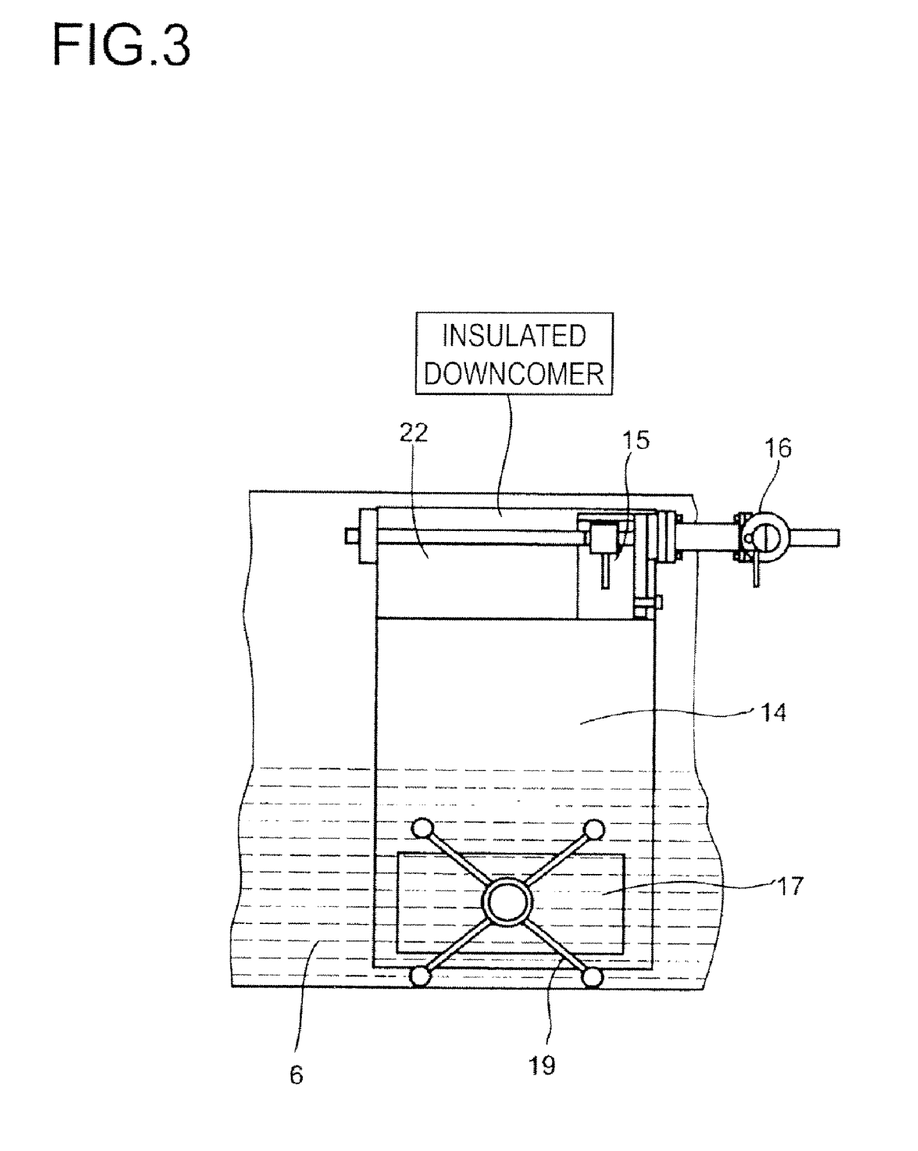
FIG. 3 shows an orifice, formed by a weir, for product removal with additional emptying flap in the weir.

FIG. 3 shows a plan view of the weir and the orifice for product removal.

In the embodiment shown in FIG. 3, the emptying flap 17 is formed in the weir 14. The emptying flap 17 is operated via the handwheel 19. The weir 14 closes an orifice in the casing 6 to such an extent that only the orifice for product removal 22 remains open. The orifice for product removal 22 is disposed in the upper third of the casing 6. In the embodiment shown here, the orifice for product removal 22 can be closed further by the flap 15, as a result of which its orifice cross section is reduced. The flap 15 is driven via the drive 16.

In addition to the embodiment shown in FIGS. 2 and 3, in which the cross section of the orifice for product removal 22 is adjusted by a flap 15 moveable in the axial direction, the cross section of the orifice for product removal 21 may also be adjusted by a flap moveable in tangential direction. The tangential flap can close the orifice either from above. In a preferred embodiment, the closure edge 21 of the weir 14 can be shifted in the direction of the orifice for product removal 22 and thus the cross section of the orifice for product removal 22 reduced.

Figure 4:
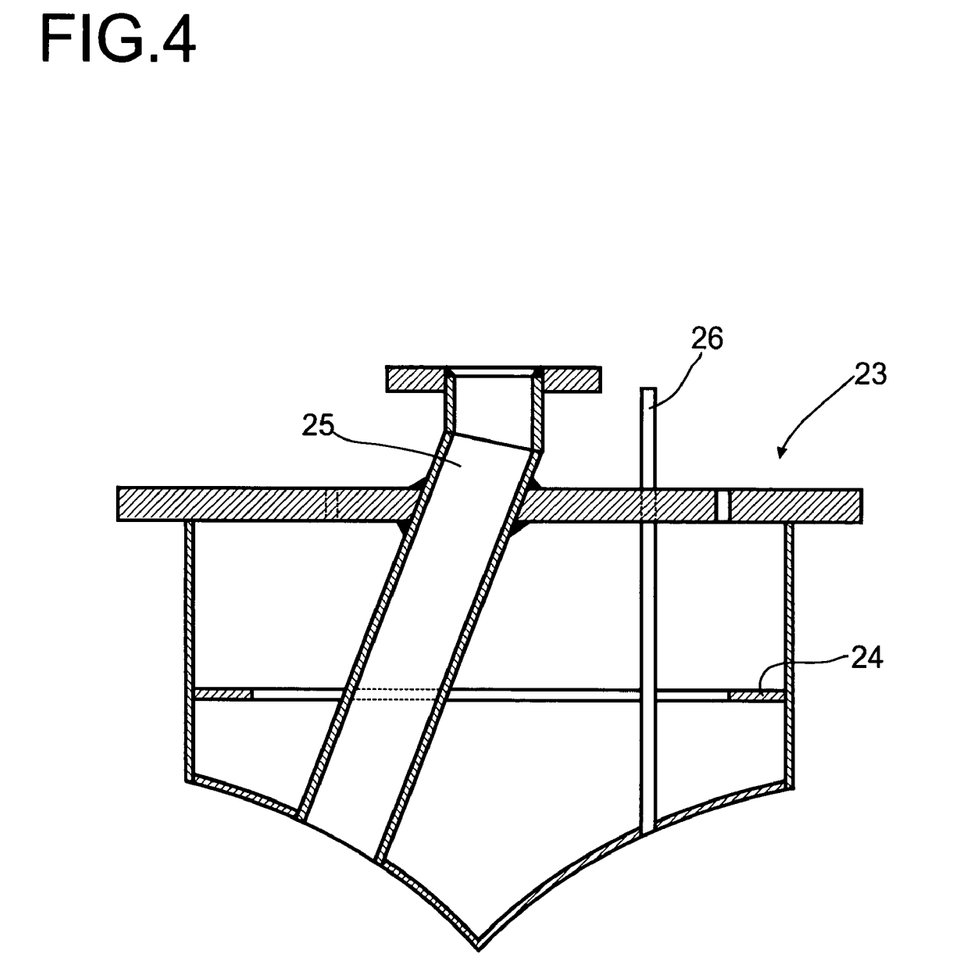
FIG. 4 shows a section through a displacer with channel for reactant feeding.

In FIG. 4, a displacer 23 is shown with which the orifice 10 can be closed. To this end, the displacer 23 is placed in the dome 20 and preferably connected to it by a screw connection via a flange. In order to save weight and material, the displacer 23 is preferably designed as a hollow body. For stabilization, an annular circumferential rib 24 is disposed in the displacer 23. In order to enable the feeding of reactants via the displacer 23, in a preferred embodiment, a channel 25 is formed in the displacer 23. It is possible via the channel 25 to feed either solid or liquid reactants to the mixing kneader 1. In the case of the alignment of the channel 25 shown in FIG. 4, the reactants are fed above one of the shafts. In addition to the oblique course shown here, it is also possible that the channel 25 runs perpendicular in the displacer 23. In addition to the feed point above a shaft, as shown here, the addition point may also be disposed centrally between the shafts.

For the addition of liquid reactants in small amounts, it is also possible for a further channel 26 to be accommodated in the displacer 23 and has a smaller cross section in comparison to the channel 25. The position at which the further channel 26 opens into the mixing kneader is preferably close to the opening position of the channel 25.

In a preferred embodiment, the channel 25 and the further channel 26 are provided with a plastics surface.

REFERENCE NUMERAL LIST

1 Mixing kneader
2 Main shaft
3 Cleaning shaft
4 Kneading bars
5 Element
6 Casing
7 Gap
8 Motor
9 Gearbox
10 Orifice
11 Orifice
12 Temperature-control medium feed
13 Temperature-control medium outlet
14 Weir
15 Flap
16 Drive
17 Emptying flap
18 Spindle
19 Handwheel
20 Dome
21 Closure edge
22 Orifice for product removal
23 Displacer
24 Rib
25 Channel
26 Channel
α Angle
β Opening angle

What is claimed is:

1. A mixing kneader comprising at least two shafts (2, 3) on whose surfaces are disposed kneading bars (4) on elements (5) and which are enclosed by a casing (6), in which at least one orifice (10) above the shafts and at least one orifice (11) for product removal are formed, the shafts (2, 3) being mounted so as to be rotatable at the same or different rates and in the same or opposite sense at both ends and being driven at at least one end, wherein the orifice (11) for product removal is configured as a weir (14) in a side wall of the casing and is adjustable during operation to adjust a fill level in the mixing kneader.

2. The mixing kneader according to claim 1, which has a reactor volume of at least 500 l.

3. The mixing kneader according to claim 1, wherein the cross section of the orifice (11) for product removal is adjusted during operation by a flap (15) shiftable in the axial direction.

4. The mixing kneader according to claim 1, wherein the cross section of the orifice (11) for product removal is adjusted during operation by a flap shiftable in the tangential direction.

5. The mixing kneader according to claim 1, wherein a height of the weir (14) forming the orifice (11) for product removal is adjustable during operation by tangential shifting of the weir.

6. The mixing kneader according to claim 1, wherein a downcomer is attached to the orifice for product withdrawal and its walls are provided with insulation.

7. The mixing kneader according to claim 1, which includes an additional closeable emptying flap (17) having an orifice cross section of at least 10,000 mm².

8. The mixing kneader according to claim 7, wherein the emptying flap (17) is disposed on the product withdrawal side in the casing (6).

9. The mixing kneader according to claim 7, wherein the emptying flap (17) is formed in the weir (14).

10. The mixing kneader according to claim 1, wherein the shafts, the elements, the kneading bars, the casing, and the displacer are manufactured from ferritic-austenitic duplex material, from a nickel-based alloy, or from titanium.

11. The mixing kneader according to claim 1 wherein the orifice (11) for product removal has a lower edge at an angle (α) to perpendicular in a range of 30 to 55°.

12. The mixing kneader according to claim 1 wherein the orifice (11) for product removal has an opening angle (β) in a range of 10 to 20°.

13. The mixing kneader according to claim 1, wherein further at least one of the following features is ensured:
   a) the shafts are designed in such a way that the flexural resonant frequencies of the shaft have a separation of at least 5% from the excitation frequencies,
   b) at least one shaft is configured as a hollow shaft and is flowed through by a temperature-control medium, an inlet (12) being disposed on one side and an outlet (13) on the other side of the shaft,
   c) the at least one orifice is closed above the shafts by a displacer (23) whose side facing shafts is configured such that a gap is present between the displacer (23) and the kneading bars of the shafts and has a maximum gap width which corresponds to the available gap width between kneading bars and casing.

14. The mixing kneader according to claim 13, wherein the orifice above the shafts is formed as a dome (20) in the casing.

15. The mixing kneader according to claim 13, wherein at least one channel (25, 26) for reactant feeding is formed in the displacer (23).

16. The mixing kneader according to claim 15, wherein a metering apparatus is accommodated in the channel (25) for reactant feeding.

17. The mixing kneader according to claim 15, wherein the at least one channel (25, 26) has a plastics surface.

18. The mixing kneader according to claim 15, wherein, in the case of at least two channels (25, 26) in the displacer, the orifices, facing the shafts, of the channels are arranged close to one another.

19. The mixing kneader according to claim 13, wherein the shafts are designed in such a way that the flexural resonant frequencies of the shaft have a separation of at least 15% from the excitation frequencies.

20. The mixing kneader according to claim 13, wherein the shafts are designed in such a way that the flexural resonant frequencies of the shaft have a separation of at least 20% from the excitation frequencies.

* * * * *